United States Patent [19]

Fleer

[11] Patent Number: 4,507,550

[45] Date of Patent: Mar. 26, 1985

[54] HIGH SECURITY CREDIT CARD, SYSTEM AND METHOD

[75] Inventor: Thomas P. Fleer, St. Louis, Mo.

[73] Assignee: UMC Industries, Inc., Stamford, Conn.

[21] Appl. No.: 494,344

[22] Filed: May 13, 1983

[51] Int. Cl.³ .............................................. G06K 7/08
[52] U.S. Cl. ................................... 235/449; 235/493; 235/487
[58] Field of Search .................. 235/449, 493, 487; 360/44

[56] References Cited

U.S. PATENT DOCUMENTS 3,982,027 7/1976 Garzieka .............................. 235/449

Primary Examiner—Harold I. Pitts
Attorney, Agent, or Firm—Senniger, Powers, Leavitt and Roedel

[57] ABSTRACT

A credit card includes a non-magnetic substrate and a first strip of permanently magnetic material extending in a first direction along the substrate. The first strip comprises a predetermined series of permanently magnetic lines, the lines defining positions along the first strip and being detectable by a magnetic reader. The predetermined series is disposed on the substrate with at least a pseudo-random starting point. The card also includes a second strip of temporarily magnetizable material extending along the substrate generally parallel to the first strip. The magnetizable material is adapted to have erasable credit indicia imprinted thereon at a spot corresponding to a preselected point in the series of the first strip. Both strips are hidden from view by non-magnetic ink. The system includes elements responsive to the series of lines and gaps of the first strip of each of a number of such cards for imprinting desired credit indicia on the second strip of each card at a spot corresponding to a preselected point in the series of lines and gaps, the location of the spot on the second strip of each card being substantially independent of the location of the spot on the second strips of other such cards. The system also includes elements for reading the second strip of each card and for accepting any indicia found thereon as valid credit indicia only when the preselected position in said series of lines and gaps is detected.

19 Claims, 5 Drawing Figures

HIGH SECURITY CREDIT CARD, SYSTEM AND METHOD

BACKGROUND OF THE INVENTION

This invention relates to credit card security systems and more particularly to a system and a method for providing greater security for a magnetically read credit card used in vending systems and the like, and to a credit card construction used therein.

Recent vending systems have been developed which rely on the use of credit cards having magnetic strips or tapes thereon with data such as credit available for use recorded magnetically on the strips. Such systems are susceptible to the fraudulent use of such credit cards.

One of the ways in which fraudulent use of credit cards is made is to counterfeit the cards by mass reproduction techniques which "skim" or copy the data recorded on a valid card to a fraudulent card.

SUMMARY OF THE INVENTION

Among the several objects and features of this invention may be noted the provision of a credit card system with improved security; the provision of such a system which makes production of fraudulent copies of valid cards difficult; the provision of such a system which distinguishes between valid cards and cheap copies; the provision of such a system which makes it difficult to add or change credit indicia on otherwise valid credit cards; the provision of a credit card for use in a system with improved security; the provision of such a credit card which is difficult to fraudulently reproduce; the provision of such a credit card as to which it is difficult to add or change credit indicia; the provision of such a credit card which is relatively simple and inexpensive in construction for an authorized producer of the cards but is relatively high in cost of construction for an illegal producer; the provision of a method of imprinting credit indicia on a credit card in such a way that fraudulent duplication of the card is difficult; the provision of such a method which detects inexpensive fraudulent copies of valid credit cards; and the provision of such a method which makes it difficult to add or change credit indicia on an otherwise valid credit card.

Briefly, a credit card of the present invention includes a non-magnetic substrate and a first strip of permanently magnetic material extending in a first direction along the substrate. The first strip is composed of a predetermined series of permanently magnetic lines, said lines being detectable by a magnetic reader and defining positions along the strip. The predetermined series is disposed on the substrate with at least a pseudo-random starting point. The card also includes a second strip of temporarily magnetizable material extending along the substrate generally parallel to the first strip. The magnetizable material is adapted to have erasable credit indicia imprinted thereon at locations along its longitudinal axis, the credit indicia being erasable by a strong magnetic field.

The high security credit card system of the present invention includes a number of credit cards, each having a non-magnetic substrate and a first strip of permanently magnetic material extending in a first direction along the substrate. The first strip is composed of a predetermined series of permanently magnetic lines, the lines defining positions along the first strip and being detectable by a magnetic reader. The predetermined series is disposed on the substrate with at least a pseudo-random starting point. The card also includes a second strip of temporarily magnetizable material extending along the subtrate generally parallel to the first strip. The magnetizable material is adapted to have erasable credit indicia imprinted thereon at locations along its longitudinal axis, the credit indicia being erasable by a strong magnetic field. Means for visually hiding the first and second strips from view are also included in the card. In addition the system includes means responsive to the series of lines of the first strip of each card for imprinting desired credit indicia on the second strip of each card at a spot corresponding to a preselected position in said series of lines. The location of the spot on the second strip of each card is substantially independent of the location of the spot on the second strips of other such cards.

A method of the present invention of encoding credit indicia on a number of credit cards, each having the elements set forth above, includes the steps of detecting a predetermined position in the series of lines on the first strip of each card, and imprinting the desired credit indicia on the second strip of each card once the predetermined position in the series has been detected. As a result the location of the credit indicia along the second strip of each card is substantially independent of the location of the indicia on other such cards.

Another method of the present invention of determining the validity of a number of credit cards, each credit card having the elements set forth above, includes the steps of electrically examining the series of lines along the first strip of each card to find a preselected position in that series, and accepting as valid credit indicia any indicia present at a location along the second strip of the card being examined corresponding to the preselected position along the first strip of the card being examined once the preselected point has been found.

Other objects and features will be in part apparent and in part pointed out hereinafter.

BRIEF DESCRIPTION OF THE DRAWINGS

Corresponding reference characters indicate corresponding parts throughout the several views of the drawing.

DESCRIPTION OF THE PREFERRED EMBODIMENT

Figure 1:
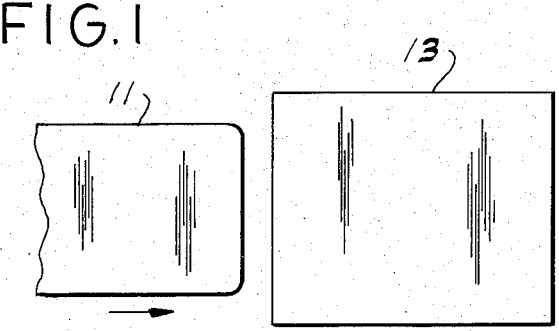
FIG. 1 is a plan of the credit card of this invention being inserted into an imprinter or encoder for addition of credit indicia thereto.

Referring now to the drawing, there is shown a credit card 11 of the present invention about to be inserted into a magnetic imprinter or encoder 13 for the addition of credit indicia thereto. Encoders which magnetically encode data onto magnetic strips are well-known in the art and any of a number of them could be used as described below.

Figure 2:
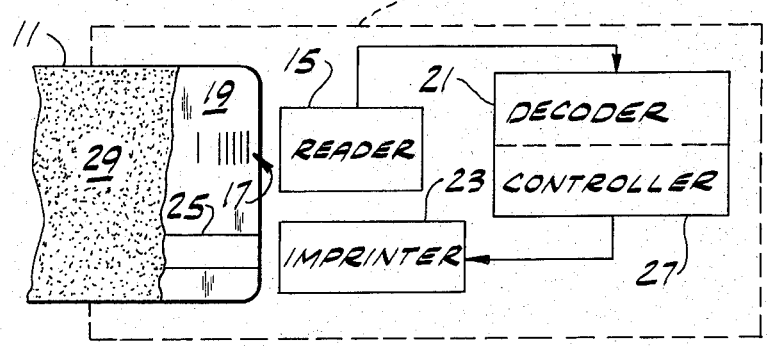
FIG. 2 is a schematic illustration similar to FIG. 1 but showing interior detail of the encoder and additional detail of the credit card.

More particularly, encoder 13 (FIG. 2) includes a magnetic reader 15 for reading the pattern of lines and gaps in a strip 17 on card 11. These lines are made of permanent magnetic material such as the iron bearing ink used in the printing of United States currency and are generally perpendicular to the longitudinal axis of strip 19. Strip 17 is thus seen to be a strip of lines of permanently magnetic material extending longitudinally across card 11 on a non-magnetic plastic substrate 19 of conventional credit card composition. The lines, as will be seen, define the various positions along strip 17. Magnetic reader 15 is also of conventional construction and supplies signals as lines are detected to decoding circuitry 21. As the decoding of magnetic lines and the circuitry necessary therefor are well known, no particular circuitry is considered to be outside the scope of this invention. Encoder 13 also includes a magnetic imprinter 23 of conventional design for erasably imprinting desired credit indicia on a strip 25 of conventional temporarily magnetizable material such as is commonly used on such credit cards. Strip 25 extends along substrate 19 generally parallel to strip 17. Imprinter 23 does not imprint the credit indicia on strip 25 at random but rather does so under the control of a controller circuit 27 which is responsive to the output of decoder 21. To provide additional security, strips 17 and 25 are completely covered by a layer 29 of black, non-magnetic ink which constitutes means for hiding strips 17 and 25 from view.

Figure 3A:
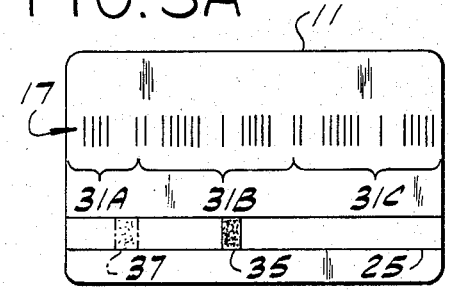
FIG. 3A is a plan of the credit card of this invention with an outer layer entirely removed to reveal internal detail.
Figure 3B:
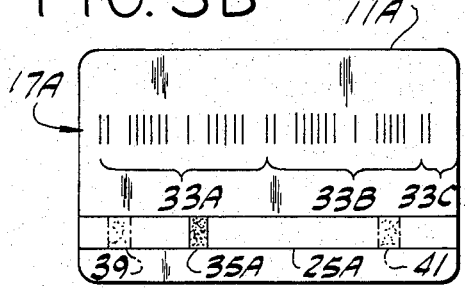
FIG. 3B is a plan similar to FIG. 3A illustrating in comparison therewith one of the features of this invention.

Card 11 is shown in FIG. 3A without layer 29 to reveal strips 17 and 25 in more detail. Strip 17 comprises a predetermined series 31B of permanently magnetic lines and gaps therebetween. The series 31B is seen to be (reading from left-to-right) two closely spaced lines, a gap, six closely spaced lines, a gap, five closely spaced lines, a gap, and then the series repeats. Note that the series does not start at the edge of the card 11 but rather starts some distance from the edge of the card. The gap and five closely spaced lines to the left of the start of the series 31B are an incomplete part of a preceding series. For convenience, this incomplete part of the series is labelled 31A, the first instance of the whole series is labelled 31B and the next repetition of the series is labelled 31C. A strip 17A on a different card 11A (see FIG. 3B) has two complete instances of the 2-6-1-5 series, labelled 33A and 33B, and one incomplete instance, labelled 33C. It is preferred that the actual starting point of a 2-6-1-5 series on the card, or equivalently the point within the series which starts at the edge of the card, be random from card to card to substantially increase the difficulty involved in duplicating the card. Even if a truly random starting point cannot be achieved, the invention may also be satisfactorily practiced with a pseudo-random starting point for the series, one which varies in a relatively unpredictable fashion from card to card. It should be understood that the particular 2-6-1-5 series shown is not critical to the present invention but is shown for illustrative purposes only. Likewise, other codes such as bar codes could also be used in the present invention.

Controller 27 controls imprinter 23 to magnetically imprint the desired credit value on strip 25 only at specified locations or spots along its longitudinal axis corresponding to a preselected position or positions in the series of lines and gaps of strip 17. In FIG. 3A that spot, labelled 35, is opposite the gap following the first single line in the series 31B from the left. In one embodiment of the system, data anywhere else along strip, such as shown in phantom at 37 in FIG. 3A, indicates an invalid card. In a second embodiment, valid data may appear at more than one specified position, but not at unspecified positions. Data at an unspecified position indicates an invalid card. For example, the card shown in FIG. 3B has valid data at 35A immediately after a single line (as in FIG. 3A) or after a double line as shown in phantom at 39. However, the data shown in phantom at 41 is invalid because the data does not appear in one of the two specified positions.

The high security system of the present invention is thus seen to include a number of cards such as cards 11 and 11A adapted to have credit indicia imprinted thereon, the location of the credit indicia on each card being substantially independent of the location on the other cards because of the at least pseudo-random starting point of the series of lines and gaps which make up strip 17. The system also includes encoder 13 which constitutes means responsive to the series of lines and gaps of strip 17 of each card for imprinting desired credit indicia on strip 25 of each card at a spot or spots corresponding to a preselected position in the series of lines and gaps.

Figure 4:
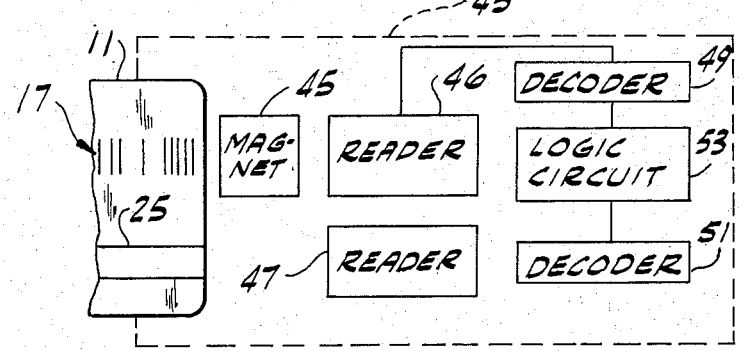
FIG. 4 is a schematic illustration similar to FIG. 2 showing a credit card of this invention being inserted into a validating mechanism of this invention.

The system also includes the decoding apparatus labelled 43 (FIG. 4) which constitutes means responsive to the series of lines and gaps of strip 17 of each card 11 for reading strip 25 of each card and for accepting any indicia found thereon as valid credit indicia only when the preselected position in the series of lines and gaps is detected substantially simultaneously with the detection of the indicia. More particularly, apparatus 43 includes a permanent magnet 45 for erasing any temporary magnetic information on strip 17 of each card as the card is inserted into apparatus 43. A counterfeiter could copy a valid card 11 by encoding the lines and gaps of strip 17 onto a temporary magnetic strip of material and encoding the credit indicia on a second such temporary magnetic strip. However, permanent magnetic 7 renders this approach useless and requires the more expensive process of duplicating strip 17 with permanently magnetic material.

Decoding apparatus 43 also includes a pair of readers 46 and 47 like reader 15 which read the magnetic information off strips 17 and 25 respectively as the cards are inserted into apparatus 43. Note that if the magnetic information on card 11 were imprinted using temporary magnetic material, reader 46 will not detect the series of lines and gaps present on a valid card because magnet 45 will have erased them. Thus, together permanent magnet 45 and reader 46 constitute means for detecting whether the series of lines and gaps in strip 17 of each card is composed of temporarily magnetized material.

Signals from both readers are fed through decoders 49 and 51 respectively, which are similar to decoder 21, to logic circuitry 53. Logic circuitry 53 is programmed or hardwired in a conventional manner to accept credit indicia only at the predetermined spots or locations along strip 25 corresponding to the predetermined positions along strip 17 and in one embodiment of the invention constitutes means for rejecting as invalid any credit card having credit indicia in more than one location along its strip 25.

From the above it will be seen that the method of the present invention of encoding credit indicia on each of a number of valid cards 11 as defined above includes the steps of detecting a predetermined position in the series of lines and gaps of strip 17 of each card and imprinting the desired credit indicia on strip 25 of each card once the predetermined position in the series has been detected. As a result, the location of the credit indicia along the seond strip of each card is substantially independent of the location of the credit indicia on other such cards.

Furthermore, the method of the present invention of determining the validity of the cards 11 includes the steps of electrically examining the series of lines and gaps of strip 17 of each card to find a preselected point or position in that series and accepting as valid credit indicia any indicia present at a location along strip 25 of the card being examined corresponding to the preselected point along the strip 17 once the preselected point has been found.

In view of the above, it will be seen that the several objects of the invention are achieved and other advantageous results attained.

As various changes could be made in the above methods, systems and products without departing from the scope of the invention, it is intended that all matter contained in the above description or shown in the accompanying drawing shall be interpreted as illustrative and not in a limiting sense.

What is claimed is:

1. A credit card capable of having erasable credit indicia imprinted thereon, said card comprising:
   a non-magnetic substrate;
   a first strip extending in a first direction along the substrate, said first strip comprising a predetermined series of permanently magnetic lines, said lines defining positions along the first strip and being detectable by a magnetic reader, said predetermined series being disposed on the substrate with at least a pseudo-random starting point; and
   a second strip of temporarily magnetizable material extending along the substrate generally parallel to the first strip, said magnetizable material being adapted to have erasable credit indicia imprinted thereon at locations along its longitudinal axis, the credit indicia being erasable by a strong magnetic field.

2. The credit card as set forth in claim 1 wherein credit indicia are disposed along the second strip only at spots corresponding to preselected positions in the series of lines of the first strip.

3. The credit card as set forth in claim 2 wherein the credit indicia are disposed along the second strip only at a spot corresponding to a preselected position in the series of lines of the first strip.

4. The credit card as set forth in claim 1 further including means for hiding at least the first strip from view.

5. The credit card as set forth in claim 4 wherein the hiding means is non-magnetic ink.

6. A high security credit card system comprising:
   a number of credit cards, each including a non-magnetic substrate, a first strip extending in a first direction along the substrate, said first strip comprising a predetermined series of permanently magnetic lines, said lines defining positions along the first strip and being detectable by a magnetic reader, said predetermined series being disposed on the substrate with at least a pseudo-random starting point, and a second strip of temporarily magnetizable material extending along the substrate generally parallel to the first strip, said magnetizable material being adapted to have erasable credit indicia imprinted thereon at locations along its longitudinal axis, the credit indicia being erasable by a strong magnetic field; and
   means responsive to the series of lines of the first strip of each card for imprinting desired credit indicia on the second strip of each card at a spot corresponding to a preselected position in said series of lines, the location of said spot on the second strip of each card being substantially independent of the location of the spot on the second strips of other such cards.

7. The high security credit card system as set forth in claim 6 further comprising means responsive to the series of lines of the first strip of each card for reading the second strip of each card and for accepting any indicia found thereon as valid credit indicia only when the preselected position in said series of lines is detected substantially simultaneously with the detection of said indicia.

8. The high security credit card system as set forth in claim 7 further comprising means for detecting whether the series of lines in the first strip of each card is composed of temporarily magnetized material.

9. The high security credit card system as set forth in claim 8 wherein the detecting means includes means for erasing any temporary magnetic information on the first strip of each card.

10. The high security credit card system as set forth in claim 6 further comprising means responsive to the series of lines of the first strip of each card for rejecting a card as invalid whenever credit indicia is detected at any spot along the second strip other than that spot corresponding to the preselected position in the series of lines of the first strip.

11. The high security credit card system as set forth in claim 6 further comprising means for detecting whether the series of lines in the first strip of each card is composed of temporarily magnetized material.

12. The high security credit card system as set forth in claim 11 wherein the detecting means includes means for erasing any temporary magnetic information in the first strip of each card.

13. The high security credit card system as set forth in claim 6 further including means for rejecting as invalid any credit card having credit indicia in more than one location along its second strip.

14. The method of encoding credit indicia on a number of credit cards each having a non-magnetic substrate, a first strip extending in a first direction along the substrate, said first strip comprising a predetermined series of permanently magnetic lines, said lines defining positions along the first strip and being detectable by a magnetic reader, said predetermined series being disposed on the substrate with at least a pseudo-random starting point, and a second strip of temporarily magnetizable material extending along the substrate generally parallel to the first strip, said magnetizable material being adapted to have erasable credit indicia imprinted thereon at locations along its longitudinal axis, the credit indicia being erasable by a strong magnetic field, said method comprising the steps of:
   detecting a predetermined position in said series of lines of the first strip of each card; and
   imprinting the desired credit indicia on the second strip of each card once the predetermined position in said series has been detected, whereby the location of the credit indicia along the second strip of each card is substantially independent of the location of the indicia on other such cards.

15. The method of determining the validity of a number of credit cards, each credit card having a non-magnetic substrate, a first strip extending in a first direction along the substrate, said first strip comprising a predetermined series of permanently magnetic lines, said lines being perpendicular to the longitudinal axis of the first strip and being detectable by a magnetic reader, said predetermined series being disposed on the substrate with at least a pseudo-random starting point, and a second strip of temporarily magnetizable material extending along the substrate generally parallel to the first strip, said magnetizable material being adapted to have erasable credit indicia imprinted thereon at locations along its longitudinal axis, the credit indicia being erasable by a strong magnetic field, said methiod comprising the steps of:

electromagnetically examining the series of lines along the first strip of each card to find a preselected point in that series; and accepting as valid credit indicia any indicia present at a location along the second strip of the card being examined corresponding to the preselected point along the first strip once the preselected point has been found.

16. The method as set forth in claim 15 further including the step of detecting whether the series of lines and gaps in the first strip of each card is composed of temporarily magnetized material.

17. The method as set forth in claim 16 wherein the detecting step includes the step of erasing any temporary magnetic information in the first strip of each card.

18. The method as set forth in claim 15 including the further step of rejecting as invalid any credit card having credit indicia in more than one location along its second strip.

19. The method as set forth in claim 15 including the further step of rejecting as invalid any credit card having credit indicia at a location along the second strip of said card which does not correspond to the preselected point along the first strip of said card.

* * * * *